US008459490B1

(12) United States Patent
McTaggart

(10) Patent No.: US 8,459,490 B1
(45) Date of Patent: Jun. 11, 2013

(54) EASY GRIP MIXING BOWLS

(76) Inventor: Stephen Scott McTaggart, Cayman Island (KY)

( * ) Notice: Subject to any disclaimer, the term of this patent is extended or adjusted under 35 U.S.C. 154(b) by 177 days.

(21) Appl. No.: 12/723,378

(22) Filed: Mar. 12, 2010

Related U.S. Application Data

(60) Provisional application No. 61/160,527, filed on Mar. 16, 2009.

(51) Int. Cl.
*B65D 21/00* (2006.01)

(52) U.S. Cl.
USPC .......................................... 220/574; 294/137

(58) Field of Classification Search
USPC ............. 220/573.1, 574, 574.1, 574.2, 574.3, 220/575; 294/172, 144, 137, 3.5, 25, 158, 294/902
See application file for complete search history.

(56) References Cited

U.S. PATENT DOCUMENTS

| 131,075 | A |  | 9/1872 | Andrews |  |
|---|---|---|---|---|---|
| 135,391 | A |  | 1/1873 | Way |  |
| 559,905 | A |  | 5/1896 | Pike |  |
| 621,306 | A |  | 3/1899 | Kneeland et al. |  |
| 1,173,768 | A |  | 2/1916 | Byerley |  |
| 1,612,383 | A |  | 12/1926 | Lepeshkin |  |
| 2,121,165 | A |  | 6/1938 | Slobodkin |  |
| 2,290,396 | A |  | 7/1942 | Webster |  |
| 2,479,765 | A |  | 8/1949 | Mower |  |
| 2,549,440 | A | * | 4/1951 | Erro | 220/23.6 |
| 2,625,020 | A |  | 1/1953 | Oliver |  |
| 2,625,274 | A |  | 1/1953 | Clements |  |
| 2,868,246 | A |  | 1/1959 | Nelson |  |
| 2,903,818 | A |  | 9/1959 | Humke |  |
| 3,110,303 | A |  | 11/1963 | Brownrigg |  |
| 3,198,377 | A |  | 8/1965 | Buckley |  |
| 4,219,144 | A | * | 8/1980 | Hagelberg | 229/406 |
| D286,726 | S |  | 11/1986 | Daenen et al. |  |
| 4,967,918 | A |  | 11/1990 | Long |  |
| 5,040,719 | A | * | 8/1991 | Ballway | 220/738 |
| 5,046,633 | A |  | 9/1991 | Chung |  |
| 5,169,023 | A |  | 12/1992 | Heiberg et al. |  |
| 5,203,836 | A |  | 4/1993 | Brazis et al. |  |
| 5,392,948 | A |  | 2/1995 | McEntee |  |
| 5,402,907 | A |  | 4/1995 | Liu |  |
| 5,419,454 | A | * | 5/1995 | Stowell et al. | 220/574 |
| 5,423,452 | A |  | 6/1995 | Tardif |  |
| D360,112 | S |  | 7/1995 | McEntee |  |
| 5,626,256 | A |  | 5/1997 | Onneweer |  |
| 5,676,275 | A | * | 10/1997 | Khattar | 220/575 |
| 5,813,638 | A |  | 9/1998 | Morris |  |
| 6,003,720 | A |  | 12/1999 | Morimoto et al. |  |
| 6,026,982 | A |  | 2/2000 | Caruthers |  |
| 6,092,689 | A | * | 7/2000 | Bennett | 220/729 |
| 6,145,906 | A | * | 11/2000 | Wright et al. | 294/172 |
| 6,431,389 | B1 |  | 8/2002 | Jerstroem et al. |  |
| 6,581,795 | B1 |  | 6/2003 | Schülein et al. |  |
| 6,739,363 | B2 |  | 5/2004 | Walter et al. |  |
| 6,789,466 | B2 |  | 9/2004 | Morgan |  |
| 7,350,657 | B2 |  | 4/2008 | Eaton et al. |  |
| 7,819,286 | B2 | * | 10/2010 | Antheil et al. | 222/105 |
| 2008/0067180 | A1 |  | 3/2008 | Schanche |  |
| 2008/0211189 | A1 | * | 9/2008 | Williams et al. | 273/348 |

* cited by examiner

*Primary Examiner* — J. Gregory Pickett
*Assistant Examiner* — Robert Poon

(57) ABSTRACT

A baking and mixing bowl includes: a bowl, having a depression in the bowl, adapted to allow the user's fingers to grip the bottom of the bowl.

2 Claims, 2 Drawing Sheets

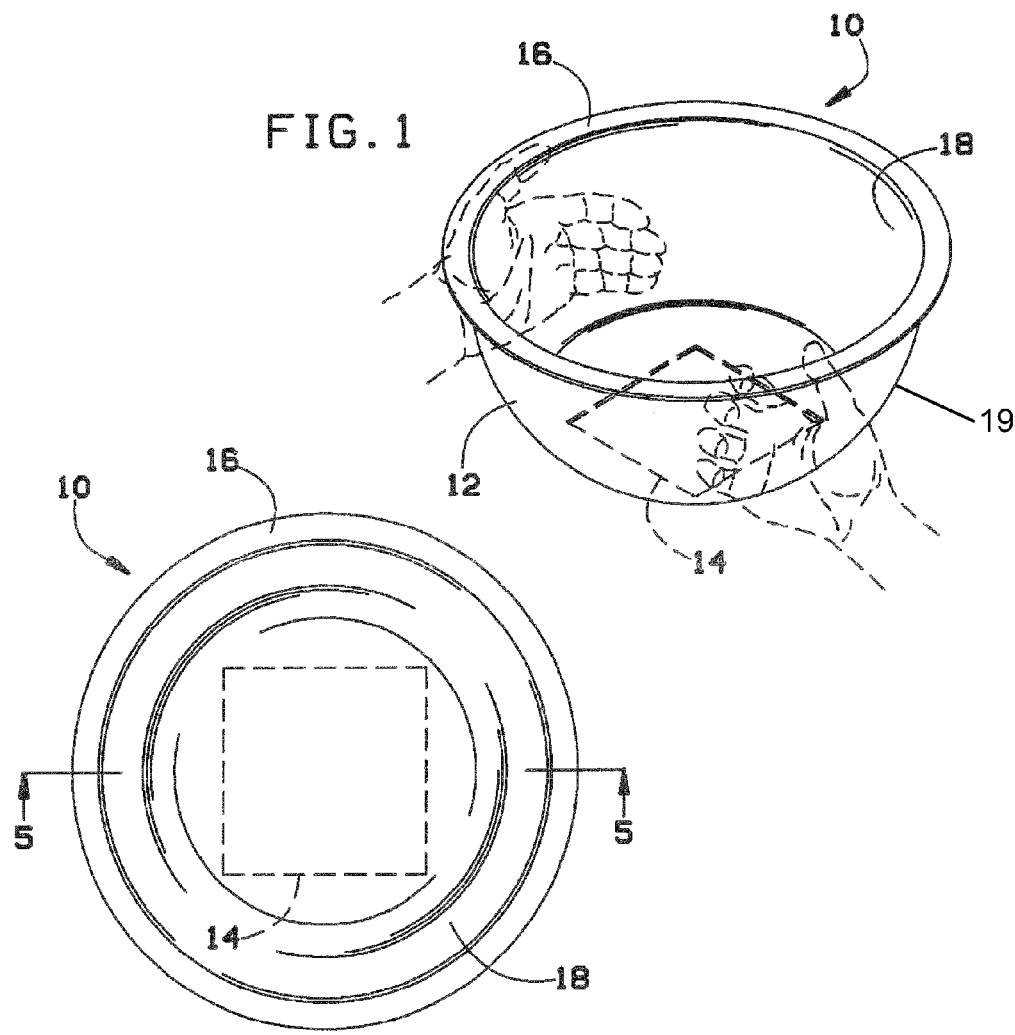
FIG.1
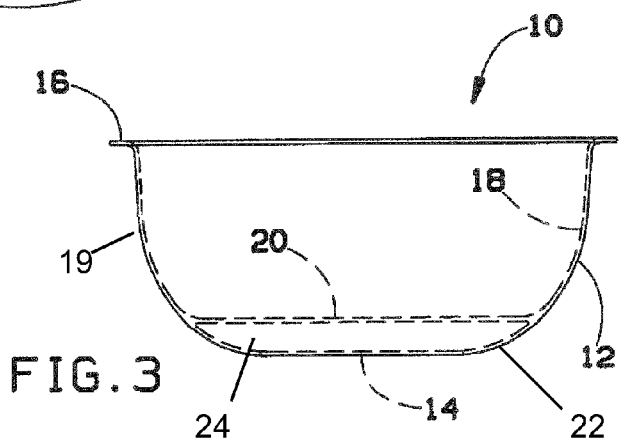
FIG.2
FIG.3

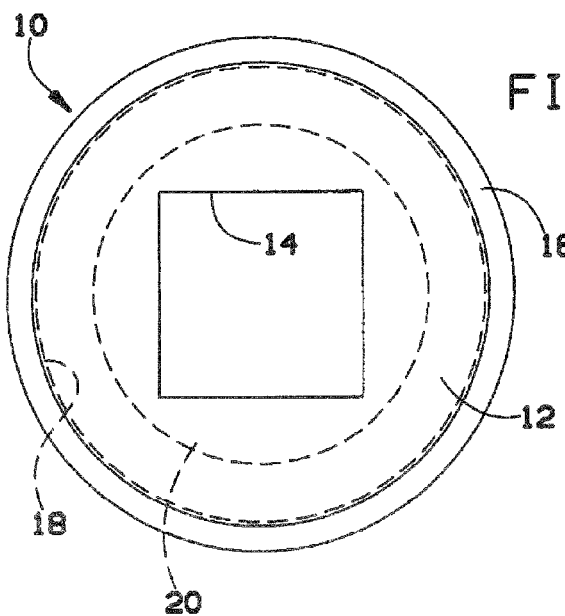
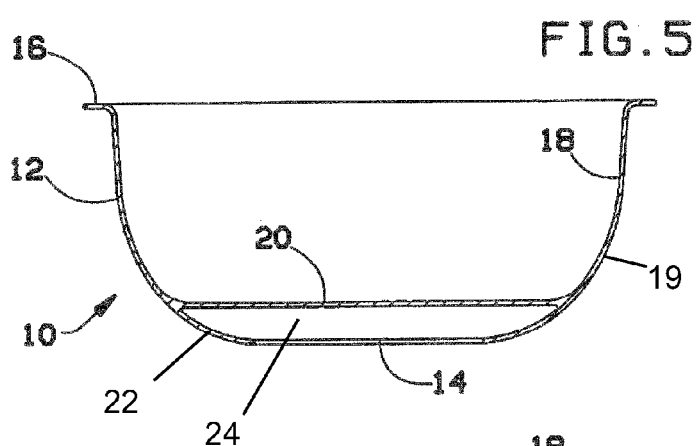
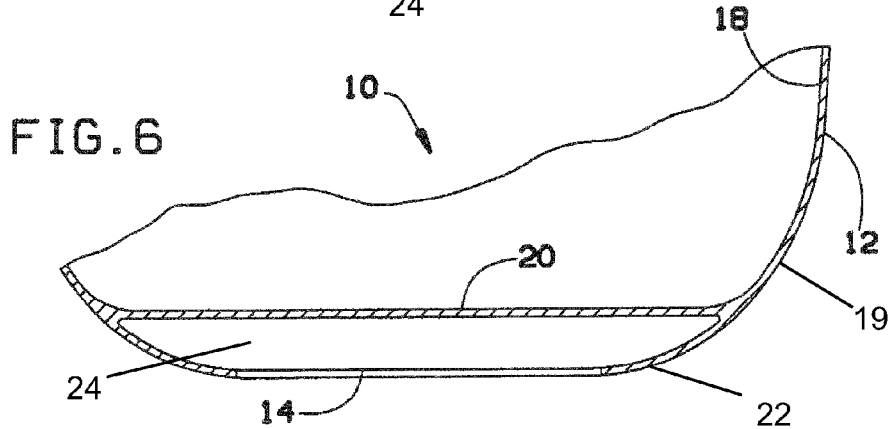

EASY GRIP MIXING BOWLS

FIELD OF THE INVENTION

The present invention is a non-provisional patent application which claims benefit to the provisional application Ser. No. 61/160,527, filed Mar. 16, 2009, the disclosure of which is incorporated in its entirety by reference herein.

BACKGROUND OF THE INVENTION

The present invention generally relates to containers and, more specifically, to a new line of baking and mixing bowls.

When using mixing bowls you have to put under your arm or hold in uncomfortable way to empty contents.

As can be seen, there is a need for new baking and mixing bowls.

SUMMARY OF THE INVENTION

In one aspect of the present invention, a bowl, utilizing a user having fingers, the bowl including: a bowl; and a depression in the bowl, adapted to allow the user's fingers to grip the bottom of the bowl.

These and other features, aspects and advantages of the present invention will become better understood with reference to the following drawings, description and claims.

BRIEF DESCRIPTION OF THE DRAWINGS

FIG. 1 is a perspective view of an embodiment of the invention;

FIG. 2 is a top view of an embodiment of the invention;

FIG. 3 is a side view of an embodiment of the invention. This figure, along with FIG. 1, shows a bowl (12) with a bottom (20), a false bottom (22) disposed beneath the bottom (20), a concavely arc-shaped inside wall (18), and a convexly arc-shaped outside wall (19) for conforming to a palm of a user, wherein a hollow cavity (24) is disposed between the bottom (20) and the false bottom (22), wherein the false bottom (22) comprises a concentrically located square hollow opening (14) having flat side edges disposed beneath the hollow cavity (24) of the bowl (12), wherein the convexly arc-shaped outside wall (19) immediately follows the flat side edges of the square hollow opening (14) disposed on the false bottom (22) of the bowl (12), wherein the square hollow opening (14) is advantageously adapted to allow a set of fingers of a user to interface and snuggly grip the square hollow opening (14) on one or more of the flat side edges, wherein for use, the user can insert the set of fingers through the hollow opening (14) to grip the bowl (12) via the flat side edges of the hollow opening (14) while the palm of the user simultaneously interfaces with the convexly arc-shaped outside wall (19) of the bowl (12) to securely hold the mixing bowl (10).

FIG. 4 is a bottom view of an embodiment of the invention;

FIG. 5 is a section view of an embodiment of the invention taken along line 5-5 in FIG. 2; and FIG. 6 is an enlarged detailed section of an embodiment of the invention illustrating the hollow or false bottom and the opening.

DESCRIPTION OF PREFERRED EMBODIMENTS

10 is an embodiment of the overall invention;
12 is the bowl;
14 is the hollow opening;
16 is the bowl lip/rim;
18 is the inside of bowl; and
19 is the convexly arc-shaped outside wall of the bowl. 20 is the bottom of the bowl. 22 is the false bottom of the bowl. 24 is the hollow cavity of the bowl.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, an embodiment of the present invention generally includes a new bowl design at the bottom of the bowl, having a hollow cavity and a false bottom, allowing the user to grip with fingers from the false bottom of bowl for better leverage.

Embodiments of the invention allows for holding underneath with a grip around circumference for no slip when emptying contents.

As depicted in the figures, the hollow opening on the false bottom allows the user to grip and hold the bowl for easier use.

The bottom of the bowl includes a hollow cavity and a false bottom, allowing the user to grip, with fingers, from the false bottom of the bowl for better leverage.

To make an embodiment of the invention, one would first make a template or mold of the new design concept. This will allow mass production.

It should be understood, of course, that the foregoing relates to exemplary embodiments of the invention and that modifications may be made without departing from the spirit and scope of the invention as set forth in the following claims.

What is claimed is:
1. A mixing bowl (10) comprising:
a bowl (12) having a bottom (20), a false bottom (22) disposed beneath the bottom (20), a concavely arc-shaped inside wall (18), and a convexly arc-shaped outside wall (19) for conforming to a palm of a user, wherein a hollow cavity (24) is disposed between the bottom (20) and the false bottom (22), wherein the false bottom (22) comprises a concentrically disposed square hollow opening (14) having flat side edges disposed beneath the hollow cavity (24) of the bowl (12), wherein the convexly arc-shaped outside wall (19) immediately follows the flat side edges of the square hollow opening (14) disposed on the false bottom (22) of the bowl (12), wherein the square hollow opening (14) is advantageously adapted to allow a set of fingers of a user to interface and snuggly grip the square hollow opening (14) on one or more of the flat side edges, wherein for use, the user can insert the set of fingers through the hollow opening (14) to grip the bowl (12) via the flat side edges of the hollow opening (14) while the palm of the user simultaneously interfaces with the convexly arc-shaped outside wall (19) of the bowl (12) to securely hold the mixing bowl (10).

2. A mixing bowl (10) consisting of:
a bowl (12) having a bottom (20), a false bottom (22) disposed beneath the bottom (20), a concavely arc-shaped inside wall (18), and a convexly arc-shaped outside wall (19) for conforming to a palm of a user, wherein a hollow cavity (24) is disposed between the bottom (20) and the false bottom (22), wherein the false bottom (22) consists of a concentrically disposed square hollow opening (14) having flat side edges disposed beneath the hollow cavity (24) of the bowl (12), wherein the convexly arc-shaped outside wall (19) immediately follows the flat side edges of the square hollow opening (14) disposed on the false bottom (22) of the bowl (12), wherein the square hollow opening (14) is advantageously adapted to allow a set of fingers of a user to interface and snuggly grip the square hollow opening (14) on one or more of the flat side edges, wherein for use, the user can insert the set of fingers through the hollow opening (14) to grip the bowl (12) via the flat side edges of the hollow opening (14) while the palm of the user simultaneously interfaces with the convexly arc-shaped outside wall (19) of the bowl (12) to securely hold the mixing bowl (10).

* * * * *